United States Patent
Bookbinder et al.

(10) Patent No.: US 12,065,384 B2
(45) Date of Patent: Aug. 20, 2024

(54) HONEYCOMB BODY MANUFACTURING METHODS

(71) Applicant: CORNING INCORPORATED, Corning, NY (US)

(72) Inventors: Dana Craig Bookbinder, Corning, NY (US); Andrea Marie Muller-Hoff, Painted Post, NY (US); Douglas Richard Wing, Corning, NY (US)

(73) Assignee: Corning Incorporated, Corning, NY (US)

( * ) Notice: Subject to any disclaimer, the term of this patent is extended or adjusted under 35 U.S.C. 154(b) by 362 days.

(21) Appl. No.: 17/297,514

(22) PCT Filed: Nov. 15, 2019

(86) PCT No.: PCT/US2019/061581
§ 371 (c)(1),
(2) Date: May 27, 2021

(87) PCT Pub. No.: WO2020/112379
PCT Pub. Date: Jun. 4, 2020

(65) Prior Publication Data
US 2022/0009840 A1 Jan. 13, 2022

Related U.S. Application Data

(60) Provisional application No. 62/773,717, filed on Nov. 30, 2018.

(51) Int. Cl.
*C04B 37/00* (2006.01)
*C04B 38/00* (2006.01)

(52) U.S. Cl.
CPC .......... *C04B 37/008* (2013.01); *C04B 37/001* (2013.01); *C04B 38/0006* (2013.01);
(Continued)

(58) Field of Classification Search
CPC .. C04B 37/008; C04B 37/007; C04B 38/0006
See application file for complete search history.

(56) References Cited

U.S. PATENT DOCUMENTS 5,254,191 A  10/1993 Mikeska et al.
5,350,551 A   9/1994 Shino
(Continued)

FOREIGN PATENT DOCUMENTS

CN    1055350 A   10/1991
CN  106220218 A   12/2016
(Continued)

OTHER PUBLICATIONS

International Search Report and Written Opinion of the International Searching Authority; PCT/US19/61581; Mailed Mar. 3, 2020; 10 pages; European Patent Office.
(Continued)

*Primary Examiner* — Alex B Efta
(74) *Attorney, Agent, or Firm* — Daniel J. Greenhalgh

(57) ABSTRACT

Methods of firing ceramic honeycomb bodies are disclosed that include placing refractory particles on and end face of the green ceramic honeycomb body, and heating the green ceramic honeycomb body to a temperature of at least 600° C. to form a fired ceramic honeycomb body. The refractory particles prevents sticking of honeycomb-to-honeycomb during firing. A layer of refractory particles can also be used to replace a green cookie.

11 Claims, 8 Drawing Sheets

(52) U.S. Cl.
CPC .. *C04B 2237/341* (2013.01); *C04B 2237/343* (2013.01); *C04B 2237/708* (2013.01)

(56) References Cited

U.S. PATENT DOCUMENTS

| | | | |
|---|---|---|---|
| 6,087,281 | A | 7/2000 | Merkel |
| 6,403,020 | B1 | 6/2002 | Altoonian et al. |
| 6,417,126 | B1 | 7/2002 | Yang |
| 6,447,712 | B1 * | 9/2002 | Dogan .................... C04B 33/32 |
| | | | 264/607 |
| 8,808,613 | B1 | 8/2014 | Yamayose |
| 9,096,472 | B2 | 8/2015 | Foster et al. |
| 9,561,985 | B2 * | 2/2017 | Uoe ......................... B01J 35/56 |
| 2006/0035194 | A1 | 2/2006 | Nakano et al. |
| 2010/0127418 | A1 * | 5/2010 | Davidson .............. F27B 9/3011 |
| | | | 425/445 |
| 2010/0130352 | A1 * | 5/2010 | Dabich, II ......... B01J 20/28045 |
| | | | 432/9 |
| 2014/0314988 | A1 * | 10/2014 | Yamayose .......... C04B 35/62892 |
| | | | 428/116 |

FOREIGN PATENT DOCUMENTS

| | | |
|---|---|---|
| EP | 0449534 A1 | 10/1991 |
| EP | 1808423 A1 | 7/2007 |
| JP | 02-199067 A | 8/1990 |
| JP | 2003-095755 A | 4/2003 |
| WO | 2004/002608 A1 | 1/2004 |
| WO | 2016/144899 A1 | 9/2016 |
| WO | WO-2017145516 A1 * | 8/2017 ............ B01J 35/04 |

OTHER PUBLICATIONS

Chinese Patent Application No. 201980090898.7, Office Action dated May 26, 2022, 5 pages (English Translation Only), Chinese Patent Office.

* cited by examiner

HONEYCOMB BODY MANUFACTURING METHODS

This is a national stage application under 35 U.S.C. § 371 of International Application No. PCT/US2019/061581, filed on Nov. 15, 2019, which claims the benefit of priority under 35 U.S.C. § 119 of U.S. Provisional Application No. 62/773,717 filed on Nov. 30, 2018, the content of which is incorporated herein by reference in its entirety.

FIELD

The present disclosure relates to firing to produce ceramic bodies and more particularly to porous ceramic honeycomb bodies useful in engine exhaust after-treatment applications and the like.

BACKGROUND

More efficient means of firing large quantities of honeycomb bodies to produce porous ceramic honeycomb bodies are valuable for production thereof.

SUMMARY

We have found that honeycomb bodies of ceramic or ceramic-forming (or ceramic-producing) material can carry an appreciable amount of liquid phase during firing and/or during reactive sintering, such as during the processing of cordierite bodies, and in particular porous ceramic bodies. In various instances, a honeycomb body can contain a liquid phase at high temperatures (for example high firing temperatures inside a firing kiln) which can result in sticking between the honeycomb body and a support or cookie and support, or which can result in honeycomb bodies sticking to one another, any of which might cause face damage to the honeycomb body and possible reduced material utilization or even product loss.

A first aspect of the present disclosure pertains to a method of firing a green ceramic honeycomb body, the method comprising setting a green ceramic honeycomb body in a furnace containing gases including oxygen; placing a layer of refractory particles on an end face of the green ceramic honeycomb body; and heating the green ceramic honeycomb body to a temperature of at least 600° C. to form a fired ceramic honeycomb body.

A second embodiment includes the feature that the green ceramic honeycomb body is set on a cookie in the furnace. In a third embodiment, the first and second embodiments include the feature that the refractory particles comprises one or more refractory metal selected from alumina, zircon, zirconia, quartz, mullite, silicon carbide, silicon nitride, aluminum titanate, cordierite, aluminum, iron, or stainless steel. In a fourth embodiment, the first through third embodiments include the feature that the refractory particles comprise metal oxides, metal carbides or metal nitrides having a melting point ≥1400° C. In a fifth embodiment, the first through fourth embodiments include the feature that the refractory particles comprise metal oxides, metal carbides or metal nitrides having a melting point ≥1500° C. In a sixth embodiment, the first through fifth embodiments include the feature that the refractory particles comprise metal oxides, metal carbides or metal nitrides having a melting point ≥1700° C. In a seventh embodiment, the first through sixth embodiments include the feature that the refractory particles comprise metal oxides, metal carbides or metal nitrides having a melting point ≥1900° C. In an eighth embodiment, the first through seventh embodiments include the feature that the refractory particles have a diameter in a range of from about 20 microns to about 2.0 mm.

In a ninth embodiment, the first through eighth embodiments include the feature that the layer of refractory particles is coated on a sheet comprising one or more of a polymer or a paper. In a tenth embodiment, the ninth embodiment includes the feature that the coating utilizes an adhesive to adhere the refractory particles to the sheet. In an eleventh embodiment, the tenth embodiment includes the feature that the adhesive is selected from one or more of a spray adhesive or a double-sided tape. In a twelfth embodiment, the tenth and eleventh embodiments include the feature that the polymer sheet, the paper sheet, and the adhesive have an impurity level ≤5 wt. %.

In a thirteenth embodiment, the ninth through twelfth embodiments include the feature that the sheet has a thickness in a range of from about 25 microns to about 2.0 mm. In a fourteenth embodiment, the ninth through thirteenth embodiments include the feature that the sheet covers at least 75% of the end face of the green ceramic honeycomb body. In a fifteenth embodiment, the ninth through thirteenth embodiments include the feature that the sheet has at least on opening revealing a portion of the end face of the green ceramic honeycomb body. In a sixteenth embodiment, the ninth through fifteenth embodiments include the feature that the sheet comprises strips of the layer of refractory particles on the end face of the green ceramic honeycomb body. In a seventeenth embodiment, the ninth through sixteenth embodiments include the feature that the sheet covers more than one green ceramic honeycomb body.

In an eighteenth embodiment, the first through seventeenth embodiments include the feature that the layer of refractory particles has a thickness in a range of from about 50 microns to about 2.0 mm. In a nineteenth embodiment, the first through eighteenth embodiments include the feature that a second green ceramic honeycomb body is disposed on an end face of the layer of refractory particles.

A twentieth embodiment pertains to a method of firing a green ceramic honeycomb body, the method comprising setting a green ceramic honeycomb body in a furnace containing gases including oxygen; placing a layer of refractory particles on an top end face of the green ceramic honeycomb body, the refractory particles comprising one or more of alumina, zircon, zirconia, quartz, mullite, silicon carbide, silicon nitride, aluminum titanate, cordierite, aluminum, iron, or stainless steel and having a melting point ≥1400° C.; and heating the green ceramic honeycomb body to a temperature of at least 600° C. to form a fired ceramic honeycomb body.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

BRIEF DESCRIPTION OF THE DRAWINGS

It will be understood that the illustrations are for the purpose of describing particular embodiments and are not intended to limit the present disclosure or appended claims thereto. The drawings are not necessarily to scale, and certain features and certain views of the drawings may be shown exaggerated in scale or in schematic in the interest of clarity and conciseness.

DETAILED DESCRIPTION

Figure 1:
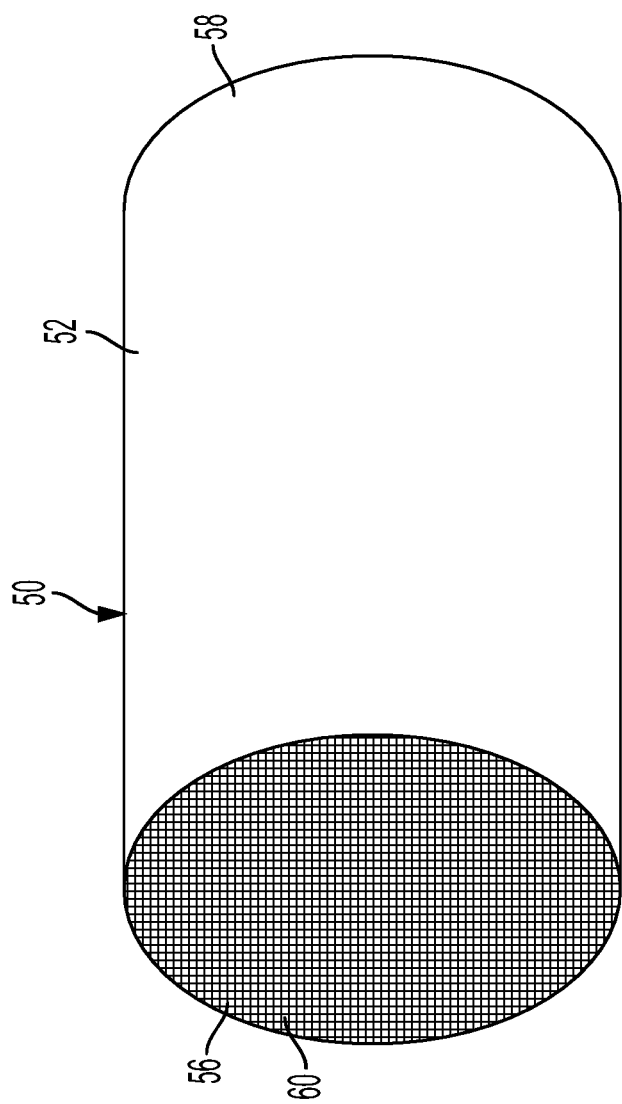
FIG. 1 is a perspective view of a honeycomb body according to one or more embodiments.

Before describing several exemplary embodiments, it is to be understood that the present disclosure is not limited to the details of construction or process steps set forth in the following disclosure. The disclosure provided herein is capable of other embodiments and of being practiced or being carried out in various ways.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

As used herein, a green ceramic body refers to a body comprised of ceramic-forming material, or a ceramic material, or a combination thereof. The green ceramic body is capable of being heated or fired such that the ceramic-forming material and/or the ceramic material sinter or reactively sinter to result in at least one ceramic solid phase upon cooling. The green ceramic body may comprise inorganic components and optional additional components, such as a binder, water, oil, and/or any other desired additive, as the ceramic green body may have been exposed to enough heating to dry the body and/or combust or volatilize the organic components without being heated enough to result in a sintering of the inorganic component particles (such as via sintering) nor enough to result in the formation of a ceramic solid phase (such as via reactive sintering). In some preferred embodiments, the green ceramic body is a green ceramic honeycomb body comprised of a plurality of cells defining axial through channels. In some embodiments, during firing of green ceramic honeycomb bodies, the green ceramic honeycomb bodies may carry an appreciable amount of liquid phase to high temperatures. Non-limiting examples of ceramic materials which can be used to form the ceramic honeycomb body include cordierite, mullite, alumina, zirconia, and aluminum titanate. Liquid phase at high temperatures, such as during reactive sintering, can cause the ceramic honeycomb to stick to a cookie or sticking to other ceramic honeycomb bodies during stacking. Such sticking can result in damage to the face of the ceramic honeycomb and consequent product loss.

Additionally, during the firing of green ceramic honeycomb bodies, unfired sacrificial ware ("green cookies") may be placed under the green ceramic honeycomb bodies to prevent end-face drag and smearing of the cell walls at the honeycomb end-face. In other words, the green cookie end-face may have the tendency to smear against the kiln shelf during firing shrinkage, and, after firing, the resulting fired cookie is discarded. A green cookie can shrink along with the green ceramic honeycomb body during firing, and, thus, the fired ceramic honeycomb end-face can remain unsmeared and in good quality. The green cookie, however, bears a high monetary cost.

Accordingly, one or more embodiments of the present disclosure provide a layer of refractory particles that prevents honeycomb-to-honeycomb sticking during firing. The layer of refractory particles prevents the mass transport of liquid between the ceramic honeycomb body at high temperature, eliminating sticking and product loss. Additionally, in one or more embodiments, the layer of refractory particles can also be used as a low-cost replacement for green cookies.

Prior to firing, the green ceramic honeycomb body is set, which may aid in managing the uniformity of the flow of gas and thermal energy during the firing process. Setting the green ceramic honeycomb body may, in certain exemplary embodiments, comprise placing the honeycomb body in a furnace such as a retort furnace configured to allow the reacting gases including oxygen to uniformly flow through all the channels of the green ceramic honeycomb body and protecting the exposed sides of the green ceramic honeycomb body. In additional exemplary embodiments, setting may comprise placing the green ceramic honeycomb body on at least one diffuser box and protecting the exposed sides of the honeycomb body. In one exemplary embodiment, setting may also include the use of at least one setter and/or cookie. In at least one exemplary embodiment, a "cookie" may be a thin slice of material, such as a thin slice of a ceramic, inorganic cement, or carbon-based honeycomb body. In at least one further exemplary embodiment, a "setter" may be an apparatus, such as a slab or plate, with or without one or more through holes, on which the honeycomb body is mounted for firing. The setter may, in one embodiment, be of the same material as the honeycomb body which is being fired. In various additional embodiments, the honeycomb body may be on a setter, which may be on at least one diffuser box.

FIG. 1 illustrates an exemplary embodiment of a ceramic honeycomb body 50 shown as a cylindrical shape having a cylindrical outer surface 52, an upstream end face 56 and a downstream end face 58. Honeycomb body 50 has a plurality of fine, parallel gas flow passages or channels 60 formed therein. The flow passages or channels 60 are formed by walls and extend through honeycomb body from upstream end face 56 to downstream end face 58, the passages 60 being unobstructed so as to permit the flow of a fluid, e.g., a gas stream, longitudinally through the honeycomb body via gas flow passages or channels 60 thereof. In some embodiments, the honeycomb body 50 may be in the form of a wall flow filter where the gas flow passages are alternately plugged at the upstream end face 56 and downstream end face 58.

Figure 2:
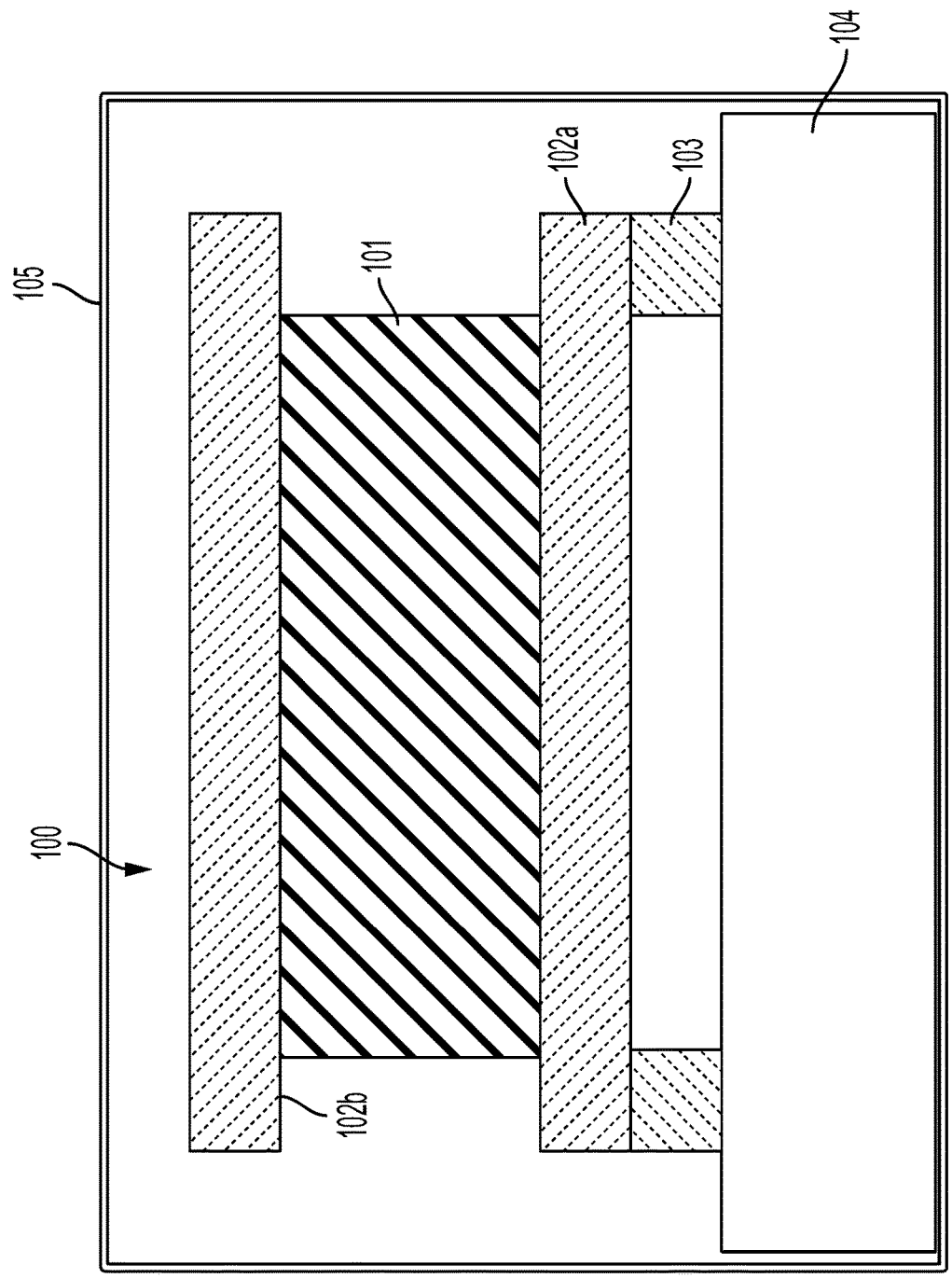
FIG. 2 schematically depicts a setter configuration in preparation for firing a green ceramic honeycomb body in accordance with the prior art.

FIG. 2 illustrates an exemplary embodiment of a setter configuration 100, according to the prior art. The ceramic honeycomb body 101 is placed on a first cookie 102a and a second cookie 102b is placed on top of the ceramic honeycomb body 101. In FIG. 2, the second cookie 102b sits upon a setter 103, which rests upon a diffuser box 104. The setter configuration 100 in FIG. 2 is placed inside a retort furnace 105.

Figure 3:
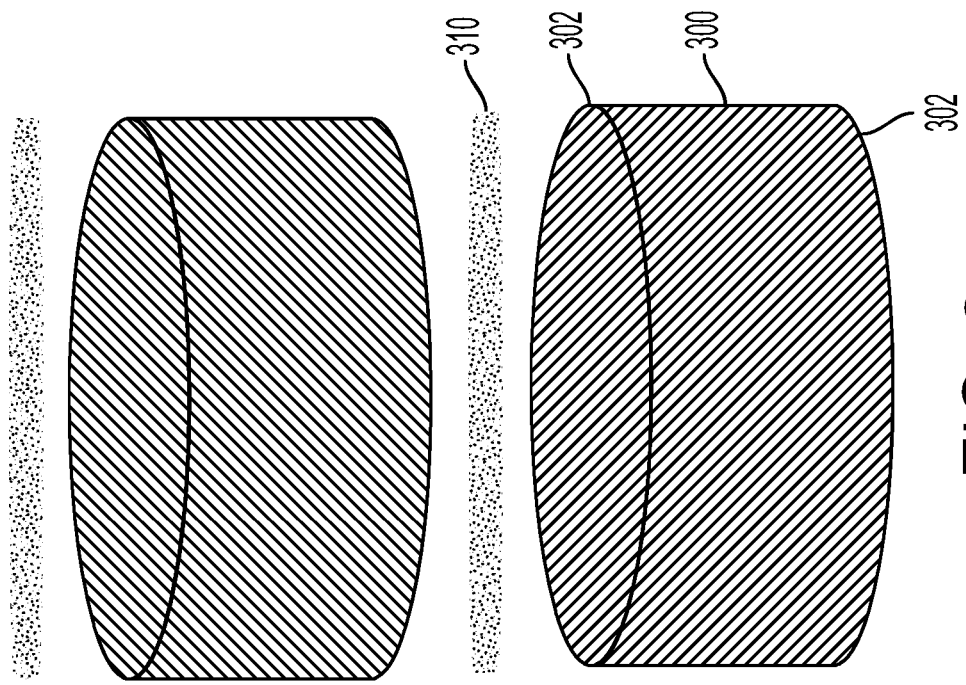
FIG. 3 illustrates a perspective elevation view in accordance with at least one exemplary embodiment.

Referring to FIG. 3, one or more embodiments of the present disclosure utilizes a layer of refractory particles 310 disposed on an end face 302 of a green ceramic honeycomb body 300. It will be understood the end face can include a top surface or a bottom surface of the green ceramic honeycomb body 300. As used herein, "refractory particles" refers to a refractory metal selected from, but not limited to, one or more of alumina, zircon, zirconia, quartz, mullite, silicon carbide, silicon nitride, aluminum titanate, cordierite, aluminum, iron, or stainless steel. In one or more embodiments, the refractory metal oxidizes to form a refractory metal oxide. In some embodiments, the refractory particles comprise metal oxides, metal carbides or metal nitrides having a melting point ≥1400° C. In other embodiments, the refractory particles comprise metal oxides, metal carbides or metal nitrides having a melting point ≥about 1500° C. In further embodiments, the refractory particles comprise metal oxides, metal carbides or metal nitrides having a melting point ≥about 1700° C. In yet further embodiments, the refractory particles comprise metal oxides, metal carbides or metal nitrides having a melting point ≥about 1900° C. In one or more embodiments, the refractory particles have an average diameter in a range of from about 20 microns to about 2.0 mm (in a range of 625 mesh to about 10 mesh), including in a range of about 30 microns to about 2.0 mm, in a range of from about 40 microns to about 2.0 mm, in a range of from about 50 microns to about 2.0 mm, in a range of from about 60 microns to about 2.0 mm, in a range of from about 70 microns to about 2.0 mm, in a range of from about 80 microns to about 2.0 mm, in a range of from about 90 microns to about 2.0 mm, in a range of from about 100 microns to about 2.0 mm, in a range of from about 150 microns to about 2.0 mm, in a range of from about 200 microns to about 2.0 mm, in a range of from about 250 microns to about 2.0 mm, in a range of from about 300 microns to about 2.0 mm, in a range of from about 350 microns to about 2.0 mm, in a range of from about 400 microns to about 2.0 mm, in a range of from about 450 microns to about 2.0 mm, in a range of from about 500 microns to about 2.0 mm, in a range of from about 550 microns to about 2.0 mm, in range of from about 600 microns to about 2.0 mm, in a range of from about 650 microns to about 2.0 mm, in a range of from about 700 microns to about 2.0 mm, in a range of from about 750 microns to about 2.0 mm, in a range of from about 800 microns to about 2.0 mm, in a range of from about 850 microns to about 2.0 mm, in a range of from about 900 microns to about 2.0 mm, in a range of from about 950 microns to about 2.0 mm, in a range of from about 1 mm to about 2.0 mm, in a range of from about 1.1 mm to about 2.0 mm, in a range of from about 1.2.0 mm to about 2.0 mm, in a range of from about 1.3 mm to about 2.0 mm, in a range of from about 1.4 mm to about 2.0 mm, in a range of from about 1.5 mm to about 2.0 mm, in a range of from about 1.6 mm to about 2.0 mm, in a range of from about 1.7 mm to about 2.0 mm, in a range of from about 1.8 mm to about 2.0 mm, or in a range of from about 1.9 mm to about 2.0 mm. In specific embodiments, the particles have a size in a range of about 50 to 200 microns According to various embodiments, the layer of refractory particles has a thickness in a range of from about 20 microns to about 5 mm, including in a range of from about 20 microns to about 5.0 mm, in a range of from about 30 microns to about 5.0 mm, in a range of from about 40 microns to about 5.0 mm, in a range of from about 50 microns to about 5.0 mm, in a range of from about 60 microns to about 5.0 mm, in a range of from about 70 microns to about 5.0 mm, in a range of from about 80 microns to about 5.0 mm, in a range of from about 90 microns to about 5.0 mm, in a range of from about 100 microns to about 5.0 mm, in a range of from about 150 microns to about 5.0 mm, in a range of from about 200 microns to about 5.0 mm, in a range of from about 250 microns to about 5.0 mm, in a range of from about 300 microns to about 5.0 mm, in a range of from about 350 microns to about 5.0 mm, in a range of from about 400 microns to about 5.0 mm, in a range of from about 450 microns to about 5.0 mm, in a range of from about 500 microns to about 5.0 mm, in a range of from about 550 microns to about 5.0 mm, in a range of from about 600 microns to about 5.0 mm, in a range of from about 650 microns to about 5.0 mm, in a range of from about 700 microns to about 5.0 mm, in a range of from about 750 microns to about 5.0 mm, in a range of from about 800 microns to about 5.0 mm, in a range of from about 850 microns to about 5.0 mm, in a range of from about 900 microns to about 5.0 mm, in a range of from about 950 microns to about 5.0 mm, in a range of from about 1 mm to about 5.0 mm, in a range of from about 1.1 mm to about 5.0 mm, in a range of from about 1.2.0 mm to about 5.0 mm, in a range of from about 1.3 mm to about 5.0 mm, in a range of from about 1.4 mm to about 5.0 mm, in a range of from about 1.5 mm to about 5.0 mm, in a range of from about 1.6 mm to about 5.0 mm, in a range of from about 1.7 mm to about 5.0 mm, in a range of from about 1.8 mm to about 5.0 mm, in a range of from about 1.9 mm to about 5.0 mm, in a range of from about 2.0 mm to about 5.0 mm, in a range of from about 2.1 mm to about 5.0 mm, in a range of from about 2.2.0 mm to about 5.0 mm, in a range of from about 2.3 mm to about 5.0 mm, in a range of from about 2.4 mm to about 5.0 mm, in a range of from about 2.5 mm to about 5.0 mm, in a range of from about 2.6 mm to about 5.0 mm, in a range of from about 2.7 mm to about 5.0 mm, in a range of from about 2.8 mm to about 5.0 mm, in a range of from about 2.9 mm to about 5.0 mm, in a range of from about 3.0 mm to about 5.0 mm, in a range of from about 3.1 mm to about 5.0 mm, in a range of from about 3.2.0 mm to about 5.0 mm, in a range of from about 3.3 mm to about 5.0 mm, in a range of from about 3.4 mm to about 5.0 mm, in a range of from about 3.5 mm to about 5.0 mm, in a range of from about 3.6 mm to about 5.0 mm, in a range of from about 3.7 mm to about 5.0 mm, in a range of from about 3.8 mm to about 5.0 mm, in a range of from about 3.9 mm to about 5.0 mm, in a range of from about 4.0 mm to about 5.0 mm, in a range of from about 4.1 mm to about 5.0 mm, in a range of from about 4.2.0 mm to about 5.0 mm, in a range of from about 4.3 mm to about 5.0 mm, in a range of from about 4.4 mm to about 5.0 mm, in a range of from about 4.5 mm to about 5.0 mm, in a range of from about 4.6 mm to about 5.0 mm, in a range of from about 4.7 mm to about 5.0 mm, in a range of from about 4.8 mm to about 5.0 mm, or in a range of from about 4.9 to about 5.0 mm. In some embodiments, the layer of refractory particles has a thickness in a range of from about 20 microns to 5 mm, including a range of from about 50 microns to about 2.0 mm, and a range of from about 50 microns to about 1 mm.

According to various embodiments, the layer of refractory particles can be multiple layers stacked on top of one another. In one or more embodiments, the refractory particles are not bonded together, and comprise a layer or layers of particles that are not bonded together. In one or more embodiments, reference to "not bonded together" means that the individual particles are not chemically or thermally bonded together prior to firing, and individual particles may include agglomerates. However, in some embodiments, a layer of particles may be bonded to a sheet of material as described further herein.

Without intending to be bound by theory, it is believed that the layer of refractory particles functions as a release layer placed in between stacked honeycomb parts, thus preventing sticking of honeycomb-to-honeycomb during firing. The layer of refractory particles prevents the mass transport of liquid between parts at high temperature, eliminating part sticking and product loss. According to one or more embodiments, the particles can be substantially spherical, non-spherical or elongate particles, such as fibers (e.g., having a length to diameter ratio of greater than 3:1).

Additionally, the layer of refractory particles placed in between the honeycomb and the kiln shelf or setter allows the honeycomb to slide, so the layer of refractory particles can also be used as a low cost replacement for green cookies.

Figure 4B:
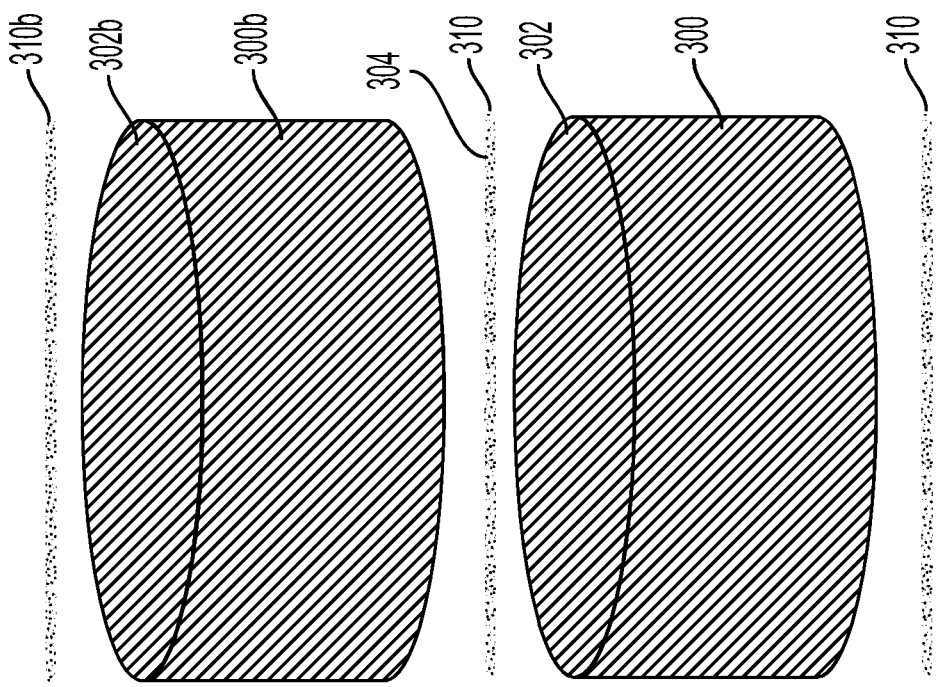
FIG. 4B illustrates a perspective elevation view in accordance with at least one exemplary embodiment.
Figure 4A:
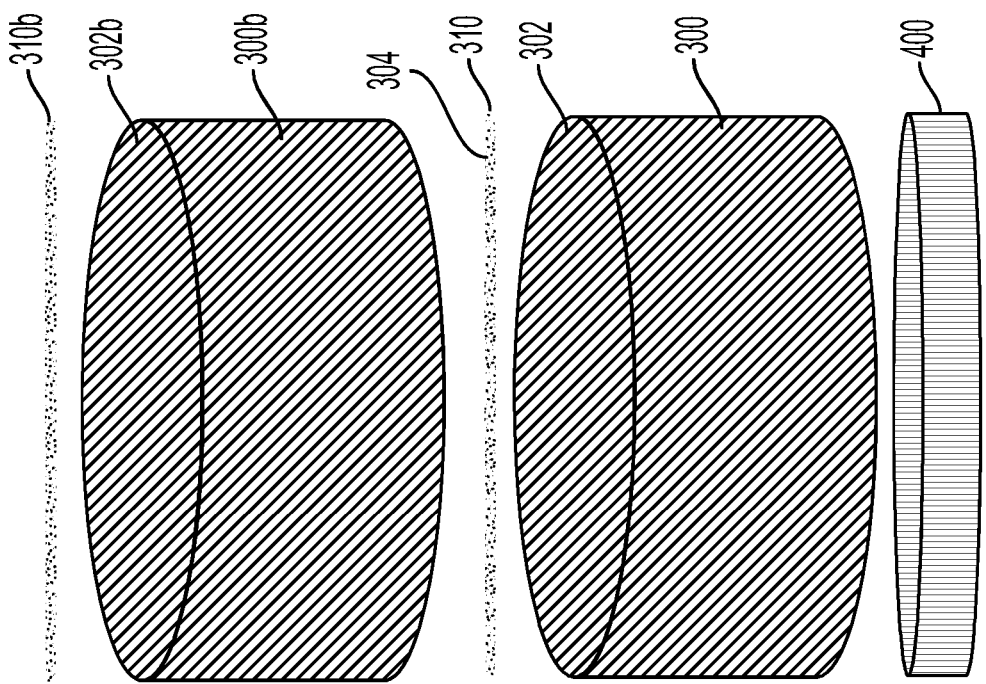
FIG. 4A illustrates a perspective elevation view in accordance with at least one exemplary embodiment.

Referring to FIG. 4A, in one or more embodiments, the green ceramic honeycomb body 300 may be placed on a cookie 400. Referring to FIG. 4B, in other embodiments, the green ceramic honeycomb body 300 may be placed on a layer of refractory particles 310, such that the layer of refractory particles replaces the cookie 400.

Referring to FIGS. 4A and 4B, according to various embodiments, a second green ceramic honeycomb body 300b can be disposed on a top surface 304 of the layer 310 of refractory particles. A second layer of refractory particles 310b can then be disposed on an end face 302b of the second green ceramic honeycomb body 300b.

Figure 5:
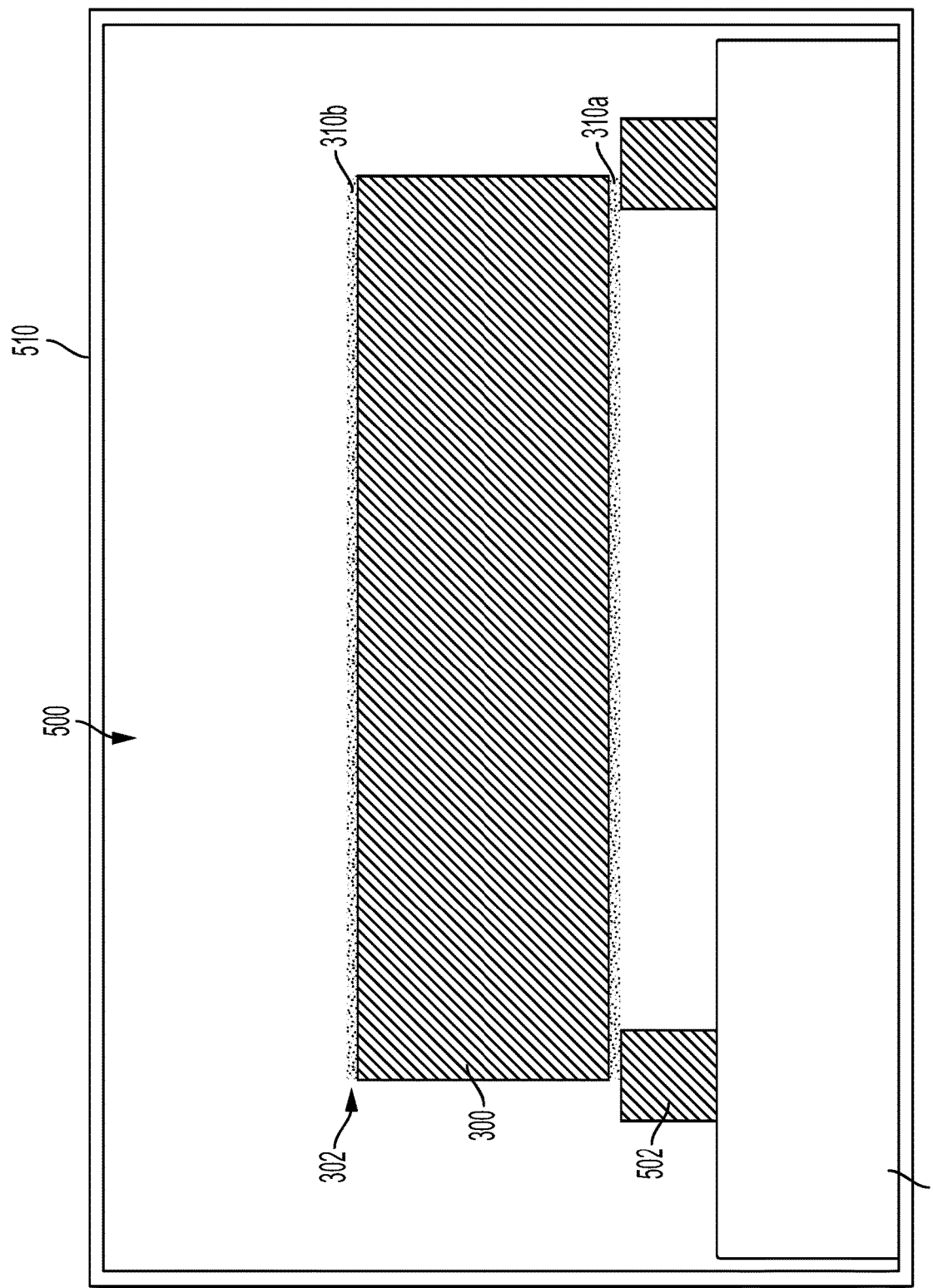
FIG. 5 schematically depicts a setter configuration in accordance with at least one exemplary embodiment.

FIG. 5 illustrates an exemplary embodiment of the setter configuration 500, according to an exemplary embodiment. The green ceramic honeycomb body 300 is placed on a layer of refractory particles 310a, and a layer of refractory particles 310b is placed on the end face 302 of the green ceramic honeycomb body 300. In FIG. 5, the layer of refractory particles 310a sits upon a setter 502, which rests upon a diffuser box 504. The setter configuration 500 in FIG. 5 is placed inside a retort furnace 510.

Figure 6:
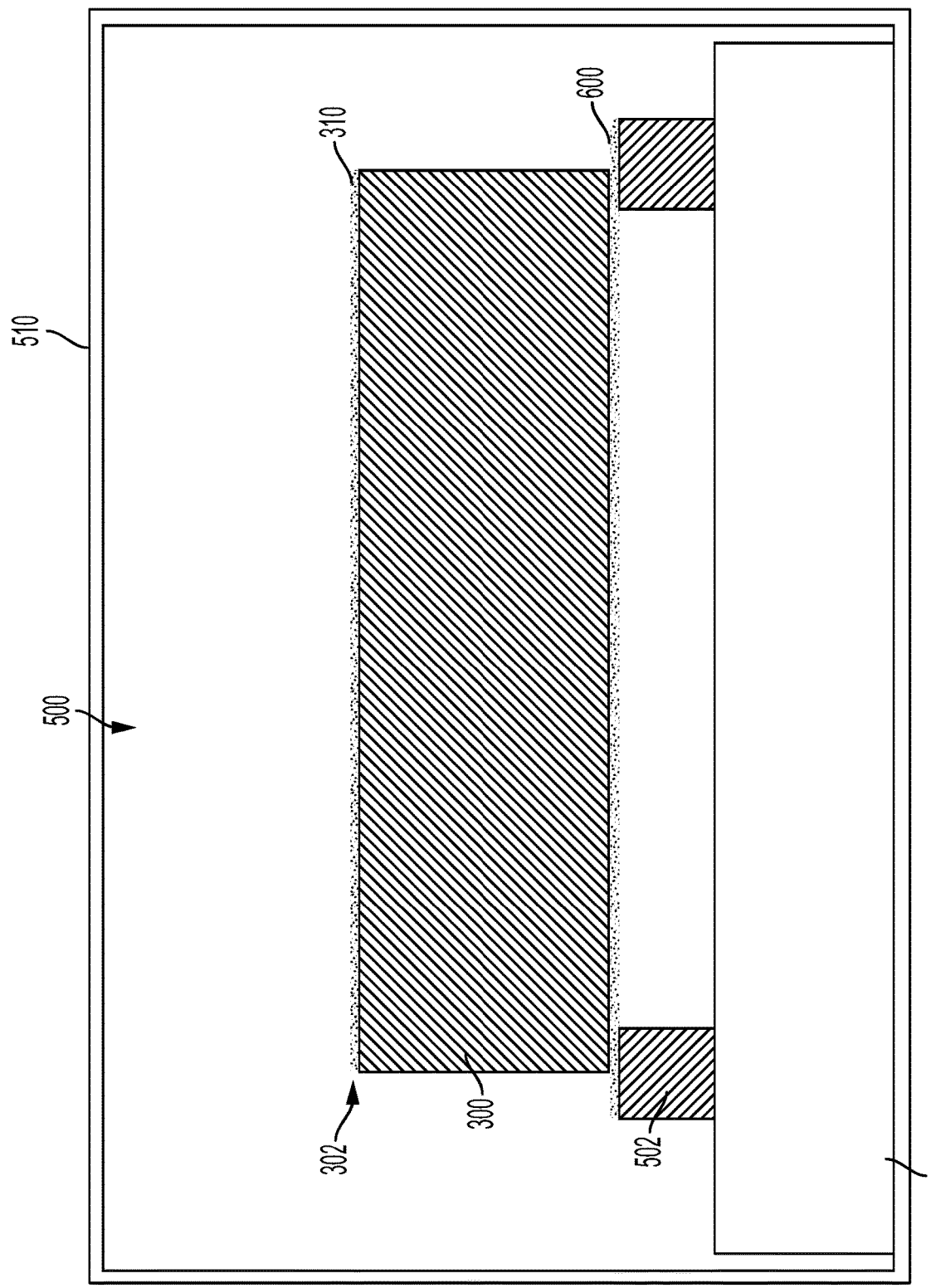
FIG. 6 schematically depicts a setter configuration in accordance with at least one exemplary embodiment.

FIG. 6 illustrates an exemplary embodiment of the setter configuration 500, according to an exemplary embodiment. The green ceramic honeycomb body 300 is placed on a cookie 600, and a layer of refractory particles 310 is placed on the end face 302 of the green ceramic honeycomb body 300. In FIG. 6, the cookie 600 sits upon a setter 502, which rests upon a diffuser box 504. The setter configuration 500 in FIG. 6 is placed inside a retort furnace 510. Thus, as exemplified in FIGS. 5 and 6, the layer of refractory particles 310a can replace the cookie 600, such that a cookie 600 is not necessary in the stack.

The cookie/honeycomb body/layer of refractory particles (FIG. 5) and the layer of refractory particles/honeycomb body/layer of refractory particles (FIG. 6) stack sits upon a plate or setter 502 that allows furnace gases to the flow through the bottom of the stack. In specific embodiments the setter 502 is a ring-shaped setter.

According to various embodiments, the method of firing a green ceramic honeycomb body may further comprise coating the layer of refractory particles onto a sheet. In some embodiments, the sheet is made of an organic material that will burn away without leaving behind a significant amount of residue. Examples of such materials include organic polymers, cellulose, a polymer, PET/PETE, PVC, acetate or a paper such as ashless paper (non-limiting examples include ashless filter paper such as Whatman® brand). In some embodiments, coating the layer of refractory particles onto a sheet utilizes an adhesive to adhere the refractory particles to the sheet. More particularly, the layer of refractory particles can be temporarily adhered with an adhesive to the green substrate or kiln shelf, or be can coated onto a polymer sheet or paper sheet (e.g., sandpaper), then placed in between green parts or a green part and the kiln shelf. Suitable examples of include a spray adhesive (e.g., 3M™ Super 77 Spray Adhesive), double-sided tape (3M™ Scotch™ brand clear tape), or any organic adhesive that will burn away without leaving behind a significant amount of residue. Thus, the adhesive can be an organic glue, resin, or paste. Other suitable adhesives include polyolefins and poly(alkyl)styrene: including (poly)-ethylene, propylene, butylene, butadiene, isoprene, chloroprene, styrene, 4-methylstyrene (homo-polymers and block and random co-polymers). Non-limiting examples include: rubber cement, Kraton® block co-polymers; polyacrylates and poly(meth)acrylates: including (poly) alkyl such as, methyl, ethyl, propyl, butyl, hydroxy-ethyl, hydroxy-propyl (homo-polymers and block and random co-polymers). These polymers can be linear or crosslinked, as well as latex dispersions of these polymers; polycarbonates: including (poly) ethylene, propylene, butylene carbonates; epoxies; phenolic resins; cellulosic polymers: including alkyl-modified celluosics (such as methyl, ethyl, hydroxy-ethyl, hydroxy-propyl and combinations thereof); organic acid modified celluosics (such as acetate, propionate and butyrate and combinations thereof); starch; polyurethanes; polyesters; hot-melt binders including (poly) ethylene-vinyl acetate, propionate, butyrate; polyesters; and silicones including silicone resins, Some embodiments include mixing together the adhesive and particles to form a slurry or suspension which could be applied either directly to the parts or formed into sheets that are then placed between the parts. According to other embodiments, the refractory particles are embedded in a polymer sheet or paper sheet. According to embodiments, the refractory particles are embedded in a polymer sheet or paper sheet without having additional adhesives between the particles and the polymer or paper sheet.

The polymer sheet may have an impurity level less than or equal to ($\leq$) 5 wt. % based on the total weight of the polymer sheet. The polymer sheet may have an impurity level less than or equal ($\leq$) to about 5 wt. %, including $\leq$about 4 wt. %, $\leq$about 3 wt. %, $\leq$about 2 wt. %, $\leq$about 1 wt. %, $\leq$about 0.5 wt. %, and $\leq$about 0.1 wt. %.

The paper sheet may have an impurity level less than or equal to ($\leq$) 5 wt. % based on the total weight of the paper sheet. The paper sheet may have an impurity level less than or equal ($\leq$) to about 5 wt. %, including $\leq$about 4 wt. %, $\leq$about 3 wt. %, $\leq$about 2 wt. %, $\leq$about 1 wt. %, $\leq$about 0.5 wt. %, and $\leq$about 0.1 wt. %.

The adhesive may have an impurity level less than or equal to ($\leq$) 5 wt. % based on the total weight of the adhesive. The adhesive may have an impurity level less than or equal ($\leq$) to about 5 wt. %, including $\leq$about 4 wt. %, $\leq$about 3 wt. %, $\leq$about 2 wt. %, $\leq$about 1 wt. %, $\leq$about 0.5 wt. %, and $\leq$about 0.1 wt. %.

The polymer sheet or the paper sheet together with the adhesive may have an impurity level less than or equal to (≤) 5 wt. % based on the total weight of the polymer sheet or the paper sheet together with the adhesive. The polymer sheet or the paper sheet together with the adhesive may have an impurity level less than or equal (≤) to about 5 wt. %, including ≤about 4 wt. %, ≤about 3 wt. %, ≤about 2 wt. %, ≤about 1 wt. %, ≤about 0.5 wt. %, and ≤about 0.1 wt. %.

Without intending to be bound by theory, the total impurity levels of the paper sheet, the polymer sheet, and the adhesive should be kept low so that they do not attack the green ceramic honeycomb body or the fired ceramic honeycomb body (for example, causing partial melting of the green ceramic honeycomb body or end-face, or the fired ceramic honeycomb body or end-face). Non-limiting impurities include: alkali (e.g., Li, Na, K), boron, talc, clay.

According to various embodiments, the sheet (e.g. polymer sheet, paper sheet, and the like) may have a thickness in a range of from about 25 microns to about 2.0 mm, a range of from about 30 microns to about 2.0 mm, a range of from about 40 microns to about 2.0 mm, a range of from about 50 microns to about 2.0 mm, a range of from about 60 microns to about 2.0 mm, a range of from about 70 microns to about 2.0 mm, a range of from about 80 microns to about 2.0 mm, a range of from about 90 microns to about 2.0 mm, a range of from about 100 microns to about 2.0 mm, a range of from about 150 microns to about 2.0 mm, a range of from about 200 microns to about 2.0 mm, a range of from about 250 microns to about 2.0 mm, a range of from about 300 microns to about 2.0 mm, about a range of from 350 microns to about 2.0 mm, a range of from about 400 microns to about 2.0 mm, a range of from about 450 microns to about 2.0 mm, a range of from about 500 microns to about 2.0 mm, a range of from about 550 microns to about 2.0 mm, a range of from about 600 microns to about 2.0 mm, a range of from about 650 microns to about 2.0 mm, a range of from about 700 microns to about 2.0 mm, a range of from about 750 microns to about 2.0 mm, a range of from about 800 microns to about 2.0 mm, a range of from about 850 microns to about 2.0 mm, a range of from about 900 microns to about 2.0 mm, a range of from about 950 microns to about 2.0 mm, a range of from about 1 mm to about 2.0 mm, a range of from about 1.1 mm to about 2.0 mm, a range of from about 1.2.0 mm to about 2.0 mm, a range of from about 1.3 mm to about 2.0 mm, a range of from about 1.4 mm to about 2.0 mm, a range of from about 1.5 mm to about 2.0 mm, a range of from about 1.6 mm to about 2.0 mm, a range of from about 1.7 mm to about 2.0 mm, a range of from about 1.8 mm to about 2.0 mm, or a range of from about 1.9 mm to about 2.0 mm. In some embodiments, the sheet (e.g. polymer sheet, paper sheet, and the like) has a thickness in a range of from about 1 micron to about 2.0 mm, or about 10 microns to about 1 mm, or about 25 microns to about 0.5 mm.

Figure 7B:
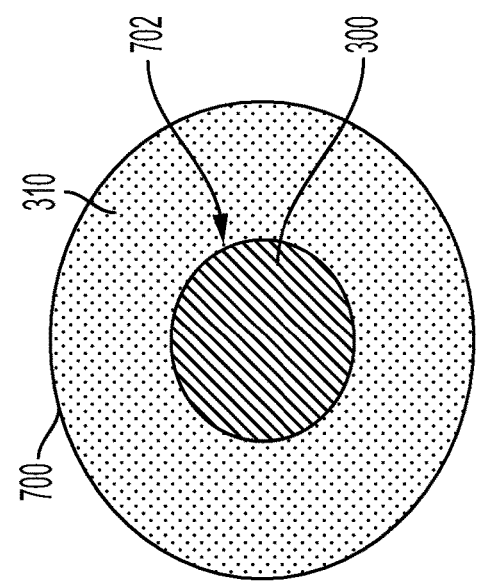
FIGS. 7A-7D shows top views of various configurations of green ceramic honeycomb body with a sheet comprising a layer of refractory particles according to one or more embodiments.
Figure 7D:
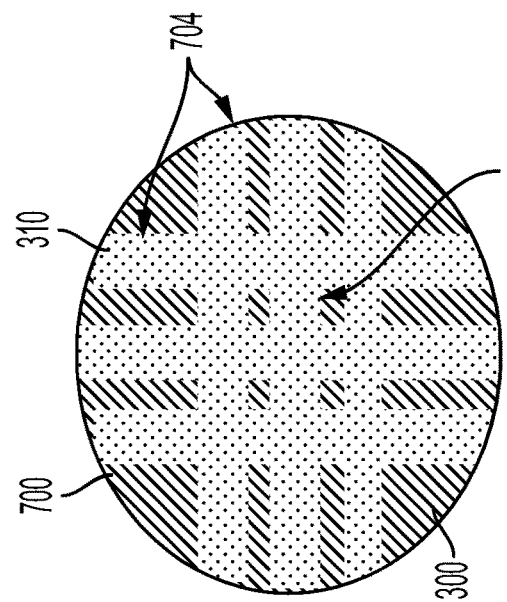
Figure 7A:
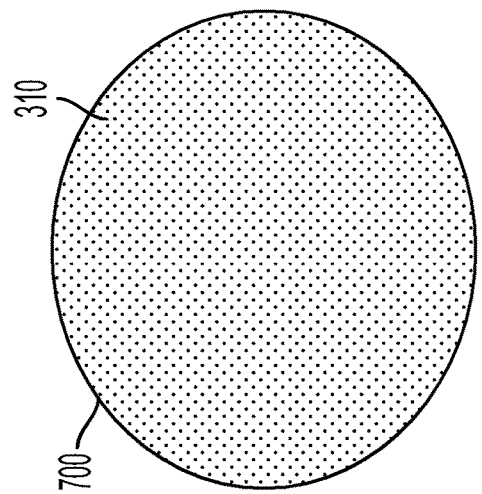
Figure 7C:
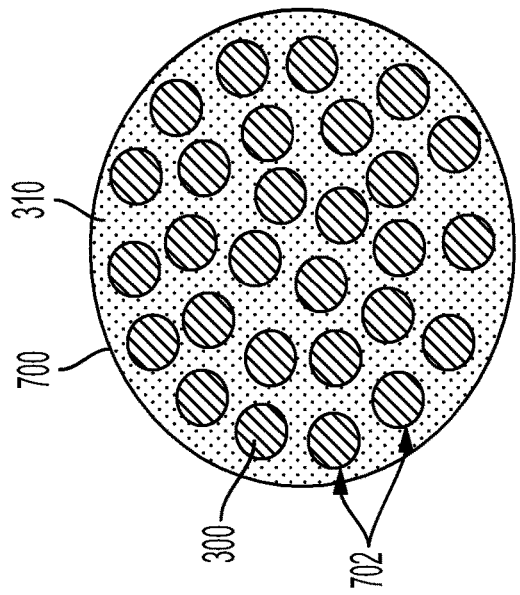

FIGS. 7A-7D illustrate top views of various configurations of a green ceramic honeycomb body with a sheet comprising a layer of refractory particles. According to one or more embodiments, the sheet 700 comprising a layer 310 of refractory particles covers at least 75% of the end face of the green ceramic honeycomb body 300. Referring to FIGS. 7B-7D, in some embodiments, the sheet 700 has at least one opening 702 revealing a portion of the end face of the green ceramic honeycomb body 300. In other embodiments, the sheet 700 comprises strips of the layer 310 of refractory particles on the end face of the green ceramic honeycomb body 300.

Figure 8:
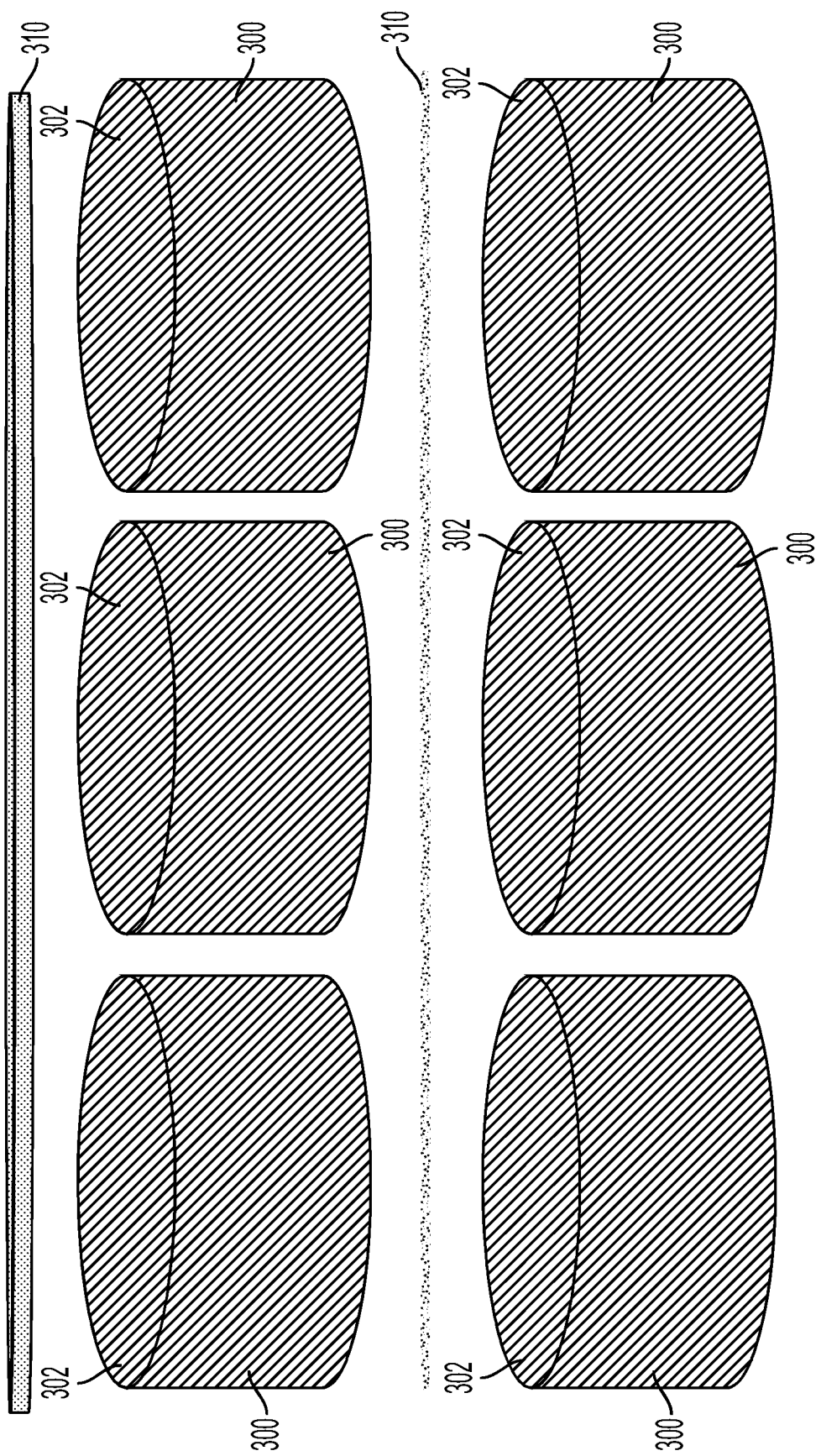
FIG. 8 illustrates a perspective elevation view in accordance with at least one exemplary embodiment.

Referring to FIG. 8, according to one or more embodiments, the layer 310 of refractory particles can cover one or more green ceramic honeycomb bodies 300. For example, a layer 310 of refractory particles can by coated onto one or more of a polymer sheet or a paper sheet, the polymer sheet or the paper sheet having a size in the range of from about 36 inches by 48 inches. The sheet coated with the layer 310 of refractory particles can be placed under or in between layers of green ceramic honeycomb bodies in order to simplify manufacturing.

According to various embodiments, the setter configuration, including the honeycomb body, is placed in an apparatus for firing, such as a furnace. In some embodiments, the furnace may be a small retort chamber or a large retort chamber. Firing may be done by any method known to those of skill in the art. According to various exemplary embodiments, firing may comprise heating the green honeycomb body and may optionally further comprise flowing at least one inert or oxidizing gas through the green honeycomb body. The green honeycomb body may be fired to achieve heat treatment and/or oxidation to form a honeycomb body.

According to one or more embodiments, the green honeycomb body may be fired by heating with process gas flow. The amount of process gas flow through the honeycomb body may, for example, be adjusted by input gas flow rates and/or amount of exhaust gas vented. In certain embodiments, process gas flow temperature may be controlled by managing the furnace temperature ramp rate. The appropriate temperature, furnace ramp rate, process gas flow rate, and/or length of soak time in the process gas(es) may be determined by those of skill in the art, and may be determined at least in part based upon the properties desired in the final product. For example, process temperatures up to about 1000° C. may be used, with soak times often ranging from a few minutes to many hours. "Soak time" refers to the period of time the furnace is held at an elevated temperature during the firing process. In addition, the temperature, furnace ramp rate, process gas flow rate, and/or length of soak time may be dependent upon one another. For example, when the temperature of the firing or gas flow rate is higher, the length of soaking may be shorter, or when the temperature or gas flow rate is lower, the length of soak time may be greater, etc. One of skill in the art may, in certain embodiments, choose the temperature, length of firing, and soak time based upon other variables as well, and these determinations are well within the ability of those skilled in the art to make.

In some embodiments, the methods comprise heat treatment and/or controlled oxidation of at least one green honeycomb body, wherein the process gas flows through the passages or channels of the honeycomb body from the inlet end to the outlet end.

In one set of embodiments herein, a method of firing a green ceramic body is disclosed comprising a plurality of axial through-channels, the method comprising: disposing the green ceramic body in a furnace wherein the body is supported on a supporting structure such that furnace gas can flow through at least some of the axial through-channels, wherein the green ceramic body is comprised of inorganic components, wherein refractory particles are disposed between the supporting structure and an outer surface of an end of the body; and then heating the green ceramic body to a temperature of at least 600° C. within the furnace for a time sufficient to cause at least some of the inorganic components to reactively sinter into a ceramic phase in a ceramic-forming reaction; wherein the refractory particles are chemically inactive in the ceramic-forming reaction. In some embodiments, the supporting structure is one or more of the group consisting of: a furnace shelf, a cookie, a setter, a diffuser box, and a second green ceramic body. In some embodiments, the supporting structure is one or more of the group consisting of: a furnace shelf, a setter, a diffuser box, and a second green ceramic body. In some embodiments, the supporting structure is one or more of the group consisting of: a furnace shelf, a diffuser box, and a second green ceramic body. In some embodiments, the heating is sufficient to result in a fired ceramic body comprising a major phase comprised of the ceramic phase. In some embodiments, the refractory particles are adhered to the green ceramic body. In some embodiments, the refractory particles are embedded in a sheet prior to the heating. In some embodiments, the sheet is incinerated during the heating. In some embodiments, the green ceramic body is a green ceramic honeycomb body. In some embodiments, the green ceramic body rests on a cookie in the furnace during the heating. In some embodiments, the refractory particles comprise alumina, zircon, zirconia, quartz, mullite, silicon carbide, silicon nitride, aluminum titanate, cordierite, aluminum, iron, stainless steel and combinations thereof. In some embodiments, the refractory particles comprise metals, metal oxides, metal carbides or metal nitrides having a melting point ≥1400° C. In some embodiments, the refractory particles comprise metal oxides, metal carbides or metal nitrides having a melting point ≥1500° C. In some embodiments, the refractory particles comprise metal oxides, metal carbides or metal nitrides having a melting point ≥1700° C. In some embodiments, the refractory particles comprise metal oxides, metal carbides or metal nitrides having a melting point ≥1900° C. In some embodiments, the refractory particles have a diameter in a range of from about 20 microns to about 2.0 mm. In some embodiments, the refractory particles are present on a sheet comprising one or more of a polymer or a paper. In some embodiments, the refractory particles are disposed in a layer having a thickness in a range of from about 50 microns to about 2.0 mm. In some embodiments, a second green ceramic honeycomb body is disposed on the refractory particles of the green ceramic body. In some embodiments, at least one pair of adjacent green ceramic bodies are disposed in the furnace, wherein refractory particles are disposed between the at least one pair of bodies. In some embodiments, refractory particles are disposed at two opposite ends of at least one green ceramic body, and at least one of the ends is separated from another green body by refractory particles.

The present disclosure is now described with reference to the following examples. Before describing several exemplary embodiments of the present disclosure, it is to be understood that the disclosure is not limited to the details of construction or process steps set forth in the following description. Other embodiments are capable of being practiced or being carried out in various ways.

EXAMPLES

Green, cordierite-forming, ceramic honeycomb bodies were placed in stacks two or 3 samples high with a short sacrificial cookie layer of the same or similar composition as the green bodies at the bottom of each stack. The cylindrical green body dimensions tested ranged from approximately 4.66 to 5.2" in diameter and approximately 4.5 to 6" in height. The same size samples were used within any given stack. Experimental barrier refractory materials were either adhered directly to the bottom face of the parts or adhered to a sheet (a sacrificial substrate material) that was placed between each interface (cookie/part and part/part interfaces). The table provides some examples of barrier materials, adhesives, and sheet materials. The stacks of ware with barriers were fired in a kiln in a process that produced bodies with greater than 90 wt % cordierite.

Post-firing, the stacks were removed from the kiln and assessed for three criteria. First, whether the parts were stuck together or the cookie was stuck to the bottom parts. Barriers were deemed to prevent sticking if the parts and cookie could be separated with little to moderate force and without damaging one or more faces of the ware. Second, how difficult it was to remove any barrier material debris stuck to the faces. Light sticking indicates that the debris was easily removed by lightly brushing or with an air gun. Moderate required more force, but not enough force to damage the part face, and heavy sticking indicates that the debris could not be removed or could not be removed without damaging the ware face. The third criteria is whether or not the ware was damaged by the barrier material or the action of separating the parts. In addition to the sources of damage noted in the first two criteria, it is possible that the barrier material or sheet that it is applied to react with the cordierite during the firing process and damage the face. The results in Table 1 show the control samples (having no refractory particles between the honeycomb samples) showed sticking between the stacked honeycombs to each other after firing and damage including visible fractures to the honeycomb endface, when the stacked honeycomb ware was separated from each other after firing. In contrast, the inventive examples shown in Table 1, having refractory particles between the honeycomb samples, prevented sticking of the stacked honeycombs to each other, and showed little to no damage of the honeycomb end-faces after they were separated from each other after firing. In Ex. 1 and 2, 3M™ Super 77 Spray Adhesive and quantitative cellulose filter paper (Whatman® Grade 42, Ashless Filter Paper) were used. In Ex. 5, acrylic co-polymer on PET film was used. In Ex. 4, 3M™ Scotch™ brand clear tape was used. In Ex. 9 and 11, a 3M Glue stick (blend of N-vinylpyrrolidinone and acetate polymers) was used. In Ex. 3, 6, 7 and 10, adhesive laminating film (C-Line Cleer Adheer 65050) was used.

TABLE 1

| Example | Control | Inventive Ex. 1 | Inventive Ex. 2 |
| --- | --- | --- | --- |
| Barrier Material | None | Alumina sand applied to part face with spray adhesive | Alumina sand applied to ashless paper with spray adhesive |
| Approx. Median Particle Size | N/A | 100 um | 100 um |
| Prevents Sticking | No | Yes | Yes |
| Sticks to ware | N/A | Moderate | Light |
| Damages ware | Yes - ware fractures when separated | No | No |

TABLE 1-continued

| Example | Inventive Ex. 3 | Inventive Ex. 4 | Inventive Ex. 5 |
|---|---|---|---|
| Barrier Material | Alumina sand on adhesive PET film | Alumina sand on double-sided acetate tape | Alumina sand with acrylic resin on PET film |
| Approx. Median Particle Size | 100 um | 100 um | 100 um |
| Prevents Sticking | Yes | Yes | Yes |
| Sticks to ware | Light | Light | Light |
| Damages ware | No | No | No |
| Example | Inventive Ex. 6 | Inventive Ex. 7 | Inventive Ex. 8 |
| Barrier Material | Alumina sand on adhesive PET film | Spray Dried Alumina Powder on adhesive PET film | Fused Alumina Beads |
| Approx. Median Particle Size | 180 um | 18 um | |
| Prevents Sticking | Yes | No | Yes |
| Sticks to ware | Light | Heavy | No |
| Damages ware | No | Yes - ware fractures when separated | Yes - Beads leave indentations on ware face |
| Example | Inventive Ex. 9 | Inventive Ex. 10 | Inventive Ex. 11 |
| Barrier Material | Mullite adhered to part with glue | Fine Ground Cordierite on adhesive PET film | Coarse Ground Cordierite adhered to part with glue |
| Approx. Median Particle Size | Powder (not measured) | Less than 75 um (−200 mesh) | 75-150 um (100-200 mesh) |
| Prevents Sticking | Yes | Yes | Yes |
| Sticks to ware | Moderate | Moderate | Light |
| Damages ware | No | No | No |

It will be apparent to those skilled in the art that various modifications and variations can be made without departing from the spirit or scope of the present disclosure. Advantageously, methods and/or devices and/or system disclosed herein can be used to help prevent damage, loss of material utilization, and/or product loss during firing of honeycomb bodies made of ceramic and/or ceramic-forming material(s).

The use of the terms "a" and "an" and "the" and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

Reference throughout this specification to "one embodiment," "certain embodiments," "one or more embodiments" or "an embodiment" means that a particular feature, structure, material, or characteristic described in connection with the embodiment is included in at least one embodiment of the present disclosure. Thus, the appearances of the phrases such as "in one or more embodiments," "in certain embodiments," "in one embodiment" or "in an embodiment" in various places throughout this specification are not necessarily referring to the same embodiment of the present disclosure. Furthermore, the particular features, structures, materials, or characteristics may be combined in any suitable manner in one or more embodiments.

Although the present disclosure herein has been described with reference to particular embodiments, it is to be understood that these embodiments are merely illustrative of the principles and applications of the present disclosure. It will be apparent to those skilled in the art that various modifications and variations can be made to the method and apparatus of the present disclosure without departing from the spirit and scope of the present disclosure. Thus, it is intended that the present disclosure include modifications and variations that are within the scope of the appended claims and their equivalents.

What is claimed is:

1. A method of firing a green ceramic honeycomb body, the method comprising:
   coating a layer of refractory particles onto a sheet comprising one or more of a polymer or a paper and placing the sheet on an end face of a green ceramic honeycomb body;
   setting the green ceramic honeycomb body in a furnace containing gases including oxygen; and
   heating the green ceramic honeycomb body to a temperature of at least 600° C. to form a fired ceramic honeycomb body,
   wherein the sheet has at least one opening revealing a portion of the end face of the green ceramic honeycomb body.

2. The method of claim 1, wherein the refractory particles comprise alumina, zircon, zirconia, quartz, mullite, silicon carbide, silicon nitride, aluminum titanate, cordierite, aluminum, iron, stainless steel and combinations thereof.

3. The method of claim 1, wherein the refractory particles have a diameter in a range of from about 20 microns to about 2.0 mm.

4. The method of claim 1, wherein coating utilizes an adhesive to adhere the refractory particles to the sheet.

5. The method of claim 4, wherein the adhesive is selected from one or more of a spray adhesive or a double-sided tape.

6. The method of claim 4, wherein the polymer sheet, the paper sheet, and the adhesive has an impurity level ≤ 5 wt. %.

7. The method of claim 1, wherein the sheet has a thickness in a range of from about 25 microns to about 2.0 mm.

8. The method of claim 1, wherein layer of refractory particles has a thickness in a range of from about 50 microns to about 2.0 mm.

9. The method of claim 1, further comprising disposing a second green ceramic honeycomb body disposed on an end face of the layer of refractory particles.

10. A method of firing a green ceramic body comprising a plurality of axial through-channels, the method comprising:
disposing the green ceramic body in a furnace wherein the body is supported on a supporting structure such that furnace gas can flow through at least some of the axial through-channels, wherein the green ceramic body is comprised of inorganic components, wherein a sheet comprising refractory particles and one or more of a polymer and a paper is disposed between the supporting structure and an end face of the body; and then
heating the green ceramic body to a temperature of at least 600° C. within the furnace for a time sufficient to cause at least some of the inorganic components to reactively sinter into a ceramic phase in a ceramic-forming reaction;
wherein the refractory particles are chemically inactive in the ceramic-forming reaction, and
wherein the sheet has at least one opening revealing a portion of the end face of the body.

11. The method of claim 10 wherein the refractory particles are adhered to the green ceramic body.

* * * * *